United States Patent [19]

Chen et al.

[11] Patent Number: 5,418,055
[45] Date of Patent: May 23, 1995

[54] HYDROHALOCARBON RESISTANT REFRIGERATOR LINERS

[75] Inventors: John C. Chen, Hockessin, Del.; Anita N. Diandreth, Orange, Tex.

[73] Assignee: E. I. Du Pont de Nemours and Company, Wilmington, Del.

[21] Appl. No.: 21,415

[22] Filed: Feb. 23, 1993

Related U.S. Application Data

[63] Continuation-in-part of Ser. No. 734,772, Jul. 23, 1991, Pat. No. 5,219,665, which is a continuation-in-part of Ser. No. 648,007, Jan. 30, 1991, abandoned.

[51] Int. Cl.$^6$ ................................ B32B 7/12
[52] U.S. Cl. ............... 428/317.7; 428/308.4; 428/319.3; 428/318.4; 428/319.7; 312/406
[58] Field of Search ............. 428/317.7, 319.3, 319.7, 428/319.9, 515, 308.4, 318.4; 312/401, 406; 220/467

[56] References Cited

U.S. PATENT DOCUMENTS

| | | | |
|---|---|---|---|
| 3,857,754 | 12/1974 | Hirata et al. | 161/227 |
| 4,082,854 | 4/1978 | Yamada et al. | 426/106 |
| 4,137,382 | 1/1979 | Vetter, Jr. | 528/271 |
| 4,275,181 | 6/1981 | Hoh | 525/190 |
| 4,410,253 | 3/1983 | Lancaster et al. | 525/60 |
| 4,480,054 | 10/1984 | Enderk | 521/84.1 |
| 4,600,746 | 7/1986 | Schmukler et al. | 525/57 |
| 4,610,914 | 9/1986 | Newsork | 428/216 |
| 4,645,695 | 2/1987 | Negi et al. | 428/35 |
| 4,704,423 | 11/1987 | Iwanami et al. | 524/503 |
| 4,707,401 | 11/1987 | Benford | 428/317.5 |
| 4,855,363 | 8/1989 | Moteki | 525/207 |
| 4,861,676 | 8/1989 | Lee | 428/516 |
| 4,877,662 | 10/1989 | Yazaki et al. | 428/36.7 |
| 4,971,864 | 11/1990 | McCord | 428/516 |
| 4,990,562 | 2/1991 | Chou et al. | 525/58 |
| 5,009,952 | 4/1991 | Klepsch et al. | 428/319.1 |
| 5,032,632 | 7/1991 | Saxton | 524/139 |
| 5,115,033 | 5/1992 | Wong | 525/285 |
| 5,118,174 | 6/1992 | Benford et al. | 312/406 |
| 5,128,196 | 7/1992 | Luetkens, Jr. et al. | 428/113 |
| 5,219,665 | 6/1993 | Chen et al. | 428/515 |
| 5,227,245 | 7/1993 | Brands et al. | 428/483 |

FOREIGN PATENT DOCUMENTS

| | | |
|---|---|---|
| 0369604 | 5/1990 | European Pat. Off. |
| 8904348 | 5/1989 | WIPO |
| 9013600 | 11/1990 | WIPO |

*Primary Examiner*—George F. Lesmes
*Assistant Examiner*—Christopher W. Raimund
*Attorney, Agent, or Firm*—Konrad Kaeding

[57] ABSTRACT

The present invention is directed to a refrigeration cabinet comprising an interior liner, a foam insulation derived from an HHC blowing agent and an outer wall. The interior liner comprises a styrene-based inner layer, an adhesive layer, and a barrier layer. The adhesive layer comprises an ethylene copolymer grafted with an anhydride or carboxylic acid moiety, and a styrene-based polymer or copolymer. The barrier layer comprises an ethylene vinyl alcohol copolymer.

8 Claims, 2 Drawing Sheets

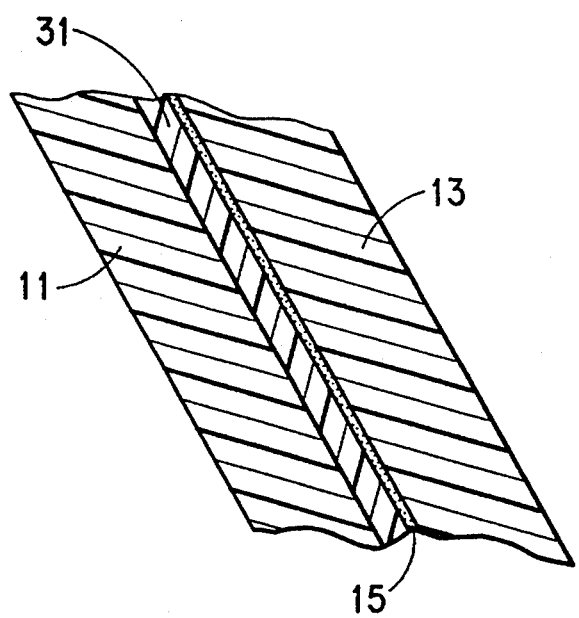
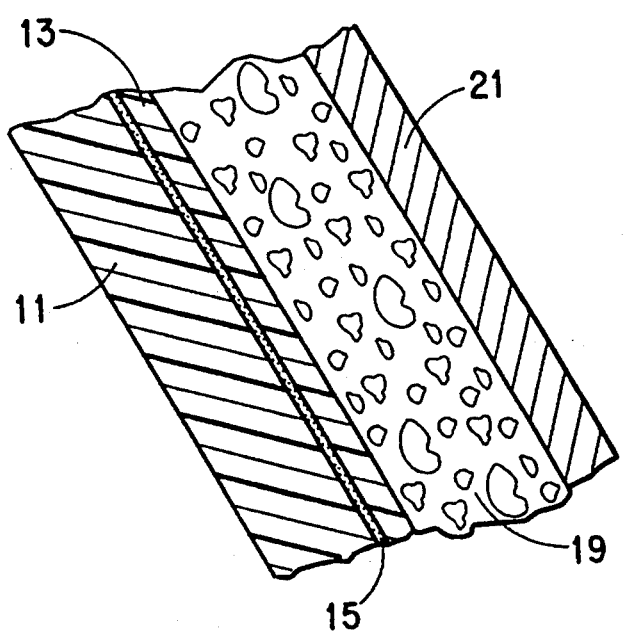
FIG. 2

5,418,055

HYDROHALOCARBON RESISTANT REFRIGERATOR LINERS

This is a continuation-in-part to U.S. Ser. No. 734,772, filed Jul. 23, 1991, now U.S. Pat. No. 5,219,665, which is a continuation-in-part of U.S. Ser. No. 648,007, filed Jan. 30, 1991, now abandoned.

FIELD OF THE INVENTION

The present invention relates generally to improved refrigerator liners. More specifically, the refrigerator liner compositions of the present invention are particularly well suited for use with insulation foam produced by hydrohalocarbons ("HHCs") or similar type blowing agents.

BACKGROUND OF THE INVENTION

Generally, refrigerator cabinets have insulation foam between an inner plastic liner and an outer metal wall. New, "environmentally friendly" refrigerator foam insulation can contain hydrohalocarbon ("HHC") blowing agents or the like, which can attack conventional styrene based refrigerator liners. The present invention has many advantages and is well suited for use with modern insulation foams derived from HHC blowing agents and the like.

SUMMARY OF THE INVENTION

The refrigerator liners of the present invention are intended to be fastened to a metal refrigerator cabinet shell. In combination, the inner refrigerator liner and the outer metal shell define an interior space into which insulation foam can be placed. The refrigerator liners of the present invention preferably comprise a structural layer (visible when viewing an open refrigerator), an adhesive layer and an HHC barrier layer. The adhesive layer secures the HHC barrier layer to the structural layer.

The structural layer is preferrably a styrene based polymer, more preferably acrylonitrile-butadien-styrene copolymer("ABS") or high impact polystyrene ("HIPS").

Suitable adhesives include grafted copolymers of ethylene with one or more vinyl ester monomers or acid derivatives thereof. The grafting monomer preferably provides anhydride or carboxylic acid moieties to the copolymer. The adhesive copolymer's melt index should be about 0.5 to about 40. The total amount of graft comonomer in the total adhesive composition is preferably between about 0.03 and about 0.5 weight percent. Preferred adhesives include: 1. grafted EVA copolymers, comprising about 3 to about 50 weight percent vinyl acetate, and 2. grafted ethylene/n-butyl acrylate/carbon monoxide terpolymers (hereinafter, "EnBACO").

The HHC barrier layer is preferably a vinyl alcohol polymer composition, more preferably an ethylene vinyl alcohol copolymer composition, although other related polymers can also be used. The preferred ethylene vinyl alcohol copolymer composition is largely or entirely a copolymer of about 25 to about 60 mole percent ethylene monomer moieties and about 40 to about 75 mole percent vinyl alcohol (i.e. saponified vinyl acetate) monomer moieties.

The adhesive layer and barrier layer are preferably combined as a single sheet, prepared by coextrusion. The sheet can then be laminated onto the structural polymer layer by known techniques.

The adhesives of the present invention also serve to compatibilize the structural layer, adhesive layer and barrier layer, so regrind or scrap from the three layers can be incorporated into the structure layer, either as a single layer or as part of a composite. Such a multilayer composite can comprise a first layer of virgin structure material together with a second layer of structure material comprising regrind.

An important aspect of the present invention relates to the use of the adhesive polymer capable of acting both as an adhesive and as a compatibilizer. That is, when a sufficient quantity of the adhesive polymer is present, scrap material (from the barrier layer, adhesive layer and styrene-based structural layer) can be reground and melted into a substantially uniform material and incorporated into the structural layer without adversely effecting the properties of the structural layer.

The present invention further comprises the process of preparing such a multiple layer structure comprising a regrind layer. This process preferably includes the steps of extruding at least one layer of the thermoformable structural polymer and at least one layer prepared from grinding and melting materials recovered from trimming of other such multiple layer structures, onto a preformed sheet of ethylene vinyl alcohol copolymer and polymeric compatibilizer.

The liners of the present invention are preferably prepared by thermoforming a single composite sheet of structural and barrier polymers to form the back wall and the side, bottom, and top walls of the interior storage compartment or refrigerator door. To obtain a final liner with a total thickness of at least about 0.5 mm, the initial sheet should be at least about 3 mm in total thickness. This relationship can be readily adjusted as necessary by one skilled in the art.

A layer of foamed polymer is generally applied to the multiple layered refrigerator liner structure described above in such a way that the barrier layer is interposed between the foam and the structural layer. The layer of foamed polymer may be applied by methods known to those skilled in the art, but preferably by injection of the reactive polymers or polymer precursors plus HHC blowing agent into a confined space bounded on one side by the above described multiple layered structure and on the other side by another structural member, such as the steel casing of a refrigerator cabinet or the like.

BRIEF DESCRIPTION OF THE DRAWINGS

FIG. 1 is a cross-sectional view of the preferred mulit-layer refrigerator liner of the present invention.

FIG. 2 is a cross sectional view of a refrigerator liner of the present invention, insulation foam and metal outer cabinet wall, as would be typical for a refrigerator apparatus.

DETAILED DESCRIPTION OF THE PREFERRED EMBODIMENT

Refrigerator Liner: Overview

Figure 3:
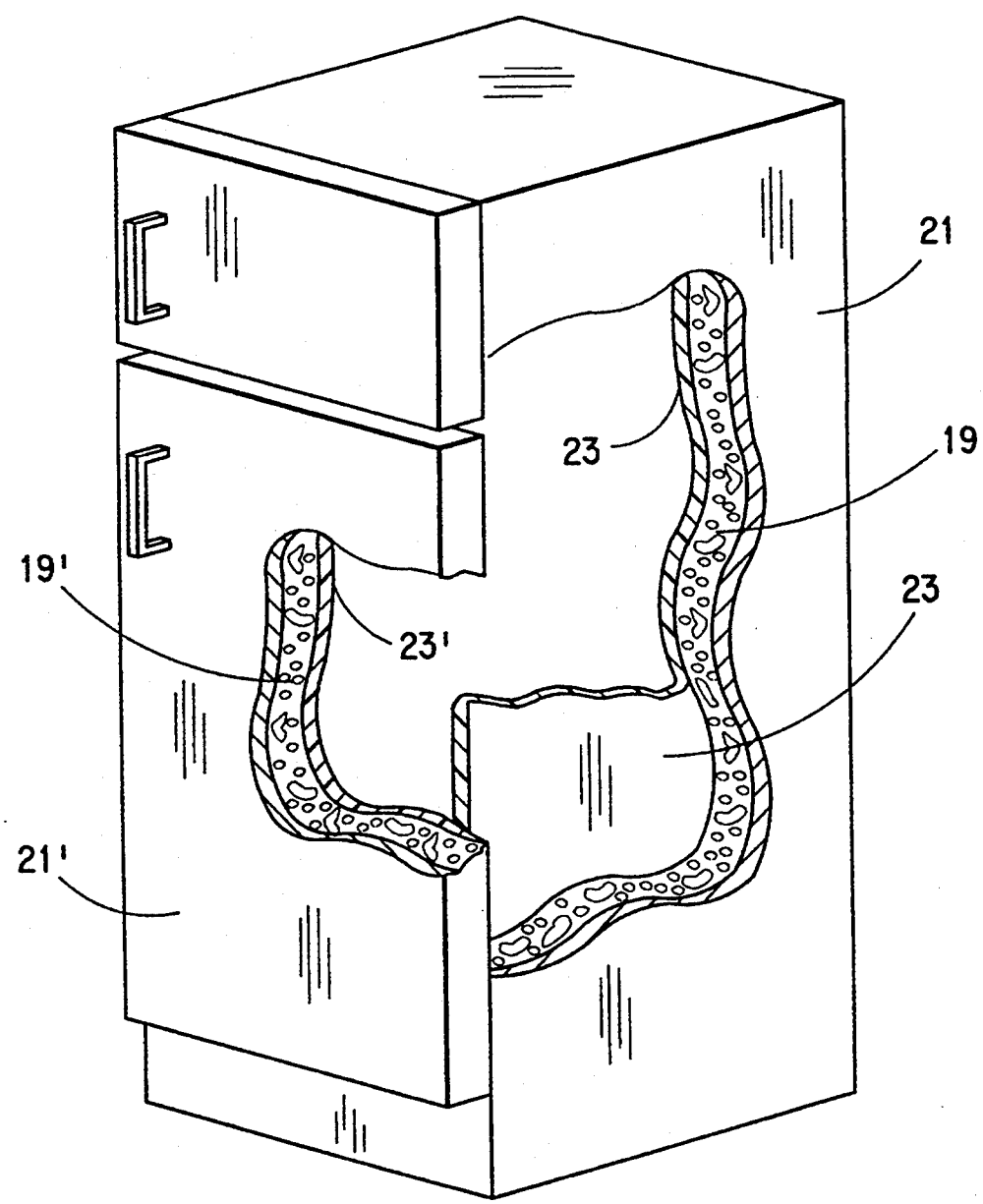
FIG. 3 is a perspective and cross-sectional view of a refrigerator apparatus.

The refrigerator liners of the present invention preferably comprise an exposed, plastic outer layer (which would be visible when viewing the inside of an open refrigerator; hereafter referred to as "structural layer"), an adhesive layer (behind the outer layer) and an HHC barrier layer (behind the adhesive layer). Each layer is described separately below.

Refrigerator Liner: Exposed Outer Layer (hereafter "Structural Layer")

The refrigerator liner's structural layer can be virtually any formable polymeric material capable of withstanding the temperature changes and physical demands commonly associated with the inner lining of a refrigerator, freezer or the like. Useful such polymeric materials can include semiamorphous polymers, polystyrene, styrene-acrylonitrile copolymers, acrylonitrile-butadiene-styrene copolymer, high impact polystyrene, polycarbonate, acrylics, styrene-maleic anhydrride copolymers, polyvinyl chloride, and amorphous polyesters, such as glycol modified polyethylene terephthalate copolyesters.

Preferably, the structural layer comprises a styrene-based polymer, such as acrylonitrile butadiene styrene terpolymer ("ABS") or polystyrene modified by styrene butadiene rubber (also called, high impact polystyrene or "HIPS"). Such materials are particularly useful, because they are comparatively strong, tough and rigid, and they can also be easily thermoformed into three-dimensional shapes. The thickness of the outer layer will depend upon the particular application but will typically be about 0.25 to about 2.5 mm. The most preferred outer layer is HIPS or ABS.

Refrigerator Liner: Adhesive Layer

Suitable adhesives include grafted copolymers of ethylene with one or more vinyl ester monomers or acid derivatives thereof; the grafting monomer preferably provides anhydride or carboxylic acid moieties to the copolymer. The more preferred vinyl ester monomers (or acids thereof) are those having one to seven carbon atoms, such as acetates, acrylates, methacrylates, acrylic acids, methacrylic acids, and carboxylic acids (particularly acrylic or methacrylic acid) partially or wholly neutralized with ions (such as zinc or sodium).

Optionally, styrene polymers or copolymers can be blended with the ethylene copolymer. Suitable such styrene polymers include HIPS, ABS and styrene-acrylonitrile ("SAN").

Preferred adhesives include those prepared from ethylene vinyl acetate ("EVA") copolymers and En-BACO terpolymers, particularly EVA copolymers grafted with maleic anhydride. Critical to the present invention is that the copolymer be sufficiently compatible with the structural layer material to provide adequate adhesion which will withstand refrigerator liner manufacture (particularly thermoforming) and long term use. The adhesive layer can be quite thin, i.e., about 0.002 to about 0.25 mm (before thermoforming).

When a first component is "compatible" with a second component, it is intended to mean that the first component can be heat mixed with the second component without significantly diminishing the properties of the predominant component.

The preferred adhesive resins of the present invention comprise a blend of about 55 to about 100 weight percent ethylene vinyl acetate ("EVA") and about 0 to about 45 weight percent of a polystryrene polymer or copolymer. The EVA component is preferably an EVA copolymer grafted with a pendant anhydride, acid or acid derivative functionality. This grafted copolymer may be blended, if desired, with additional ungrafted EVA.

The grafted EVA preferably comprises about 3 to about 50 weight percent, more preferably about 15 to about 35 weight percent vinyl acetate. The grafted EVA copolymer can further comprise other comonomers, such as alkyl acrylates and methacrylates having alkyl groups such as methyl, ethyl, propyl, isopropyl, n-butyl, isobutyl, t-butyl, n-pentyl, n-hexyl, 2-ethylhexyl, and the like, propyl vinyl ether, acrylonitrile, and methacrylonitrile. Preferred such comonomers are alkyl acrylates and methacrylates, particularly n-butyl acrylate. The comonomer selected from this group will preferably comprise about 0 to about 45 weight percent of the main chain of the copolymer.

If non-grafted EVA is also used, the amount of vinyl acetate in the nongrafted EVA should be within about 10 weight percent of the amount of vinyl acetate in the grafted EVA. Furthermore, the total amount of copolymerized vinyl acetate from both the grafted and ungrafted EVA should exceed about 13.5 weight percent of the adhesive polymer(s). The melt index of the copolymers(s) should be about 0.5 to about 40.

The grafting monomer can be any ethylenically unsaturated monomer, di or polycarboxylic acid or ethylenically unsaturated acid anhydrides, including derivatives of such acids or anhydrides. Examples include acrylic acid, methacrylic acid, maleic acid, fumaric acid, itaconic acid, crotonic acid, itaconic anhydride, maleic anhydride and dimethyl maleic anhydride. Maleic anhydride is most preferred.

Melt grafting can be done using a heated extruder, a Brabender TM or Bandbury TM mixer (or other similar type, mixing or kneading machine), roll mill or the like. The grafting may be carried out in the presence of a radical initiator, such as a suitable organic peroxide, organic perester, or organic hydroperoxide. The graft copolymers are recovered by any method which separates or utilizes the graft polymer that is formed. Thus the graft copolymer can be recovered in the form of precipitated fluff, pellets, powders and the like.

The amount of monomer grafted onto the EVA copolymer is not particularly limiting and may be as low as about 0.03 weight percent or as much as about 5 percent or even more, based on the weight of the grafted EVA copolymer. The total amount of graft comonomer in the total adhesive composition, however, is important and should be between about 0.03 and about 0.5 weight percent of the total composition.

Refrigerator Liner: Barrier Layer

The polymeric barrier layer must not only have excellent barrier properties towards hydrohalocarbons used as foam blowing agents, but it must also be suitable for thermoforming. Therefore, it should be thermoformable at a temperature compatible with the thermoforming conditions used for the structural polymer layer.

The barrier layer is preferably a vinyl alcohol polymer composition, preferably an ethylene vinyl alcohol copolymer composition, although other related polymers can also be used. For example, partially hydrolyzed polyvinyl acetate may be suitable for some applications; polyvinyl alcohol itself may be useful under certain circumstances, if it is adequately plasticized.

The preferred ethylene vinyl alcohol copolymer composition is largely or entirely a copolymer of about 25 to about 60 mole percent ethylene monomer moieties and about 40 to about 75 mole percent vinyl alcohol (i.e. saponified vinyl acetate) monomer moieties. If barrier properties are particularly important, the copolymer will preferably comprise about 25 to about 45 mole percent ethylene monomer and about 65 to about 75 mole percent vinyl alcohol. If thermoformability is particularly important, the copolymer will preferably comprise about 35 to about 60, and more preferably about 40 to about 50 mole percent ethylene monomer.

Other alkenes, such as propylene, may also be used as part of the barrier copolymer. Optionally, additional comonomers can be used in amounts suitable to provide processability and toughness, such additional comonomers include vinyl acetate, acrylates, acrylic or methacrylic acid or their derivatives.

If the copolymer comprises less than about 40 mole percent vinyl alcohol, the barrier properties are generally diminished. If it comprises more than about 75 mole percent vinyl alcohol, processability is generally diminished, particularly the thermoprocessability. In either event, the copolymer becomes less suitable as a barrier layer for thermoformed structures.

The vinyl alcohol moieties preferably should be substantially completely saponified; for example, at least 90%, preferably at least 95%, or most preferably at least 98% or even 99% vinyl alcohol moieties should be saponified. Incomplete saponification generally leads to a reduction in barrier properties of the polymer, but can also lead to improved processability; for this reason, polymers with degrees of saponification as low as 80% can sometimes be used, depending upon the performance requirements of the end use application.

Alternatively, the barrier layer may be a blend of polymers. In particular, compositions of at least about 50 percent by weight of EVOH copolymer and up to about 50 percent by weight of a polyamide component provide improved thermoformability.

The barrier layer may also contain customary amounts (e.g up to about 30 weight percent) of other modifiers as are known in the art for improving toughness, processability, thermal stability and the like, especially polymeric modifiers such as polyolefins, ethylene copolymers, ionomers, vinyl ester polymers, polyesters, polyethers, polyurethanes, and elastomers. Modest amounts of fillers, especially plate-like fillers such as mica and talc, can be added to further improve the barrier properties of this layer provided they do not interfere with the thermoformability of the barrier layer.

The thickness of the barrier layer (after thermoforming) will depend on the degree of barrier protection that is desired and on the effectiveness of the barrier material itself. For use in a refrigerator liner, typical thicknesses will range from about 0.002 to about 00.5 mm, preferably about 0.01 to about 0.1 mm, and more preferably between about 0.025 to about 0.05, as measured after thermoforming. The thickness of the barrier layer before thermoforming is typically about 0.01 to 0.8 mm, preferably about 0.05 to 0.4 mm and more preferably about 0.075 to about 0.25. When thinner layers are used, proportionately greater permeation can occur; use of layers thicker than this generally provides little added protection and is generally less economical.

Refrigerator Liner: Structural Layer+Adhesive Layer+Barrier Layer

The adhesive layer and barrier layer are preferably combined as a single sheet, prepared by coextrusion. The sheet can then be laminated onto the structural polymer layer by known techniques. In a suitable lamination process, a film of EVOH and an adhesive layer is passed through a nip roll along with a melt of a structural polymer in a sheet extrusion process. The adhesive layer is in contact with a hot melt of the structural polymer layer.

The EVOH film should not be exposed to excessive heat from the molten structural polymer or from other sources before it enters the nip roll; otherwise the EVOH layer could soften and possibly wrinkle or sag. The film should be laminated under sufficient tension to maintain a flat surface. A similar lamination procedure can be employed using a subsequent polishing roll rather than a nip roll, provided that the surface of the sheet is sufficiently heated to provide good adhesion.

The barrier layer is normally applied to the structural layer by lamination, a manufacturing process which is well known to those skilled in the art, although other processes such as coextrusion, extrusion coating, spray coating, powder coating, or solution coating can be used.

A final structure according to the present invention is shown generally in FIG. 1. Referring to FIG. 1, layers 11, 13, and 15 are the structural layer, the barrier layer, and the adhesive layer, respectively. Layer 31 represents the regrind layer and is composed of a vinyl alcohol polymer (preferably ethylene vinyl alcohol copolymer) from layer 13, the styrenic polymer from layer 11, and the adhesive from layer 15. Layer 31 can also include recycled material generated from layer 31 itself, which will normally be the case in a commercial operation.

The ability to recycle the regrind material as shown in FIG. 1 depends on selection of a material as the adhesive which will also serve to compatibilize the barrier material and the structural material so as to form a blend which retains reasonable structural strength.

Whenever a formed article such as a refrigerator liner is prepared from a sheet, there will necessarily be some excess material at the edges of the sheet after forming. This material must be trimmed away from the formed article and discarded or recycled in some appropriate way. A particularly preferred embodiment of the present invention permits this scrap material to be efficiently recycled.

An important aspect of the present invention relates to the use of the adhesive polymer capable of acting both as an adhesive and as a compatibilizer. That is, when a sufficient quantity of the adhesive polymer is present, scrap material (from the barrier layer and styrene based structural layer) can be reground and melted into a substantially uniform material for use as part of the structural layer.

Accordingly, the present invention encompasses a multiple layer structure comprising a layer of a styrenic structural polymer, as described above, a layer of a vinyl alcohol polymer composition, as described above, and a layer of the above-described polymeric compatibilizer or adhesive, which is present in a sufficient amount to compatibilize a melt blend prepared by grinding and melting the layers.

The present invention further comprises the process of preparing such a multiple layer structure with a regrind layer. This process specifically can include the steps of extruding at least one layer of the thermoformable structural polymer and at least one layer prepared from grinding and melting materials recovered from trimming of other such multiple layer structures, onto a preformed sheet of ethylene vinyl alcohol copolymer and polymeric compatibilizer.

It is desirable that the melt comprising the regrind stream should be sufficiently well mixed in order to assure the maximum compatibilizing effect. It is also permissible to add a certain amount of virgin structural polymer to the regrind stream to maintain the "regrind" layer thickness, as will be apparent to a person skilled in the art.

Thermoforming

Thermoforming is well known to those skilled in the art. It is particularly useful for forming shaped articles and is distinct from the initial melt processing step. The shaped articles of the present invention are preferably liners for refrigerators, freezers, and similar type insulated cabinets. The liners can be prepared by thermoforming a single composite sheet of structural and barrier polymers to form the back wall and the side, bottom, and top walls of the interior storage compartment.

A similar thermoforming process can be used to prepare the inner liner for the refrigerator door, which is also considered a part of the liner for purposes of this invention. The extent of deformation necessary to form a door liner is less than that for the refrigerator cavity itself, but most refrigerator doors do have a definite three-dimensional structure, with molded-in shelves and the like. Preferably, the barrier layer is at or slightly above its softening temperature during the thermoforming process.

The thickness of the multiple layer structure (prior to thermoforming) will depend upon the degree of drawing or stretching by the thermoforming process. For formation of a full refrigerator liner, the overall draw ratio may be a factor of 3–6x. Thus, to obtain a final liner with a total thickness of about 0.5 mm, the initial sheet should be at least about 3 mm in total thickness. This relationship can be readily adjusted as necessary by one skilled in the art.

Refrigerator Liner+Foam

A layer of foamed polymer is generally applied to the multiple layered refrigerator liner structure described above in such a way that the barrier layer is interposed between the foam and the structural layer. The layer of foamed polymer may be applied by methods known to those skilled in the art, but preferably by injection of the reactive polymers or polymer precursors plus blowing agent into a confined space bounded on one side by the above multiple layered structure and on the other side by another structural member, such as the steel casing of a refrigerator cabinet or the like.

Such an application is shown in FIG. 2, where 19 is the foam and 21 is the outer metal cabinet of the refrigerator or otherwise the second structural member (not drawn to scale). The foam can be any of a number of polymeric materials well known in the art, preferably a polyurethane. The blowing agent is a material which is designed to form cells in the polymeric material and thus convert it into a foam. (The blowing agent can also itself provide additional insulative value after the foaming is completed.)

Blowing agents are generally liquids at ordinary (ambient) temperatures and under pressure, but they readily form a gas upon release of pressure or upon heating. While hydrocarbons such as butane, pentane, and the like have been used as blowing agents, newly developed hydrohalocarbons are preferred for their relative inertness, environmental "friendliness", low flammability and toxicity, and low heat of vaporization.

Preferred hydrohalocarbon blowing agents include HCFC 123, $CHCl_2CF_3$, and HCFC 141B ($CHCl_2CH_2F$). The present invention is capable of using foam derrived from hydrohalocarbon blowing agents, because the styrene-based outer layer is protected from the damaging nature of such materials due to the innovative combination of adhesive layer and barrier layer as described above.

The Final Structure

When the present invention is used in the formation of a refrigerator liner, the thermoformed structure is assembled to an outer member, which is normally the outer metal body or shell of the refrigerator or the refrigerator door, shown in FIG. 3 as 21 and 21'. A clearance is maintained between the thermoformed structure and the outer shell, adequate to contain a customary amount of foamed polymeric insulation, 19 and 19'. The barrier layer faces this clearance or space.

A foamable polymeric composition is injected into the open space, by processes which are well known to those skilled in the art, so that the space between the outer shell and the inner liner (23 and 23') is effectively filled with insulating foam. Because of the presence of the barrier layer, the HCFC is substantially retained in the volume 19 defined by the liner 23 and the outer body 21. The HCFC blowing agent thus does not contact the structural layer of the refrigerator liner, which thereby remains free from HCFC-induced cracking, blistering or distortion.

Examples 1–7 and Comparative Examples C1–C12

Permeability Measurements

The permeability of hydrohalocarbons through a layer of a variety of polymeric materials was measured by the process described in ASTM-D-1434, procedure M (November, 1982) except that a vacuum gauge rather than a manometer was used to measure differential vacuum. The materials measured were approximately 0.3–0.9 mm (0.01–0.03 inches) thick.

Steady state permeation coefficient for hydrofluorocarbon 134A ($CH_2FCF_3$) through polymeric materials, measured at 93° C., are reported in Table I, and for hydrochlorofluorocarbon 123 ($CHCl_2CF_3$) in Table II. The results show that ethylene vinyl alcohol copolymer exhibits barrier properties to these hydrohalocarbons which are about an order of magnitude better than those of many other commonly used barrier materials. Although some samples of polyesters appear to exhibit good barrier properties (Table II), such materials do not exhibit the ease of thermoformability required for many applications. For example, they often exhibit significantly higher forming temperatures than those of ABS or HIPS (about 145°–160° C. for ABS). It is believed that good barrier properties are more uniformly and reproducibly achievable using EVOH.

TABLE I

HFC 134A

| Ex. | Polymer | Permeation Coefficient[a] |
|---|---|---|
| 1 | EVOH (32 mol % ethylene) | 0.034 |
| 2 | blend of EVOH of Ex. 1 (80%) + amorphous polyamide[b] (20%) | 0.036 |
| 3 | blend of EVOH of Ex. 1 (60%) + | 0.04 |

TABLE I-continued

HFC 134A

| Ex. | Polymer | Permeation Coefficient[a] |
|---|---|---|
| | ionomer[c] (40%) | |
| 4 | blend of EVOH of Ex. 1 (50%) + ionomer[c] (42.5%) + E/nBA/GMA terpolymer[d] (6%) | 0.05 |
| 5 | 3 layers: EVOH of Ex. 1 (0.1 mm) + adhesive[e] (0.04 mm) + polypropylene (0.1 mm) | 0.04 |
| C1 | butadiene/acrylonitrile rubber | 13 |
| C2 | nylon 66,6 copolymer with 18% n-butylbenzene sulfonamide plasticizer | 1.79 |
| C3 | nylon 6 toughened with 19% EPDM rubber and compatibilizer | 0.21 |
| C4 | Nylon 12 | 0.52 |
| C5 | Nylon 1212 | 0.64 |
| C6 | Crystalline polyethylene terephthalate (annealed) | 0.13 |

[a] $10^{-10}$ (cm$^3$-STP)(cm)/(sec)(cm$^2$)(cm-Hg)
[b] amorphous polyamide is the copolymer of hexamethylenediamine with 70 percent isophthalic acid and 30 percent terephthalic acid.
[c] terpolymer of ethylene, 24 wt. % n-butyl acrylate, and 9 wt. % methacrylic acid, 70% neutralized with zinc ions.
[d] terpolymer containing 26 wt. % n-butyl acrylate and 1.4 wt. % glycidyl methacrylate. (The blend also contains 1% Zn stearate and 0.5% Irganox ™ 1010 antioxidant.)
[e] polypropylene grafted with 0.11% maleic anhydride.

TABLE II

HCFC 123

| Ex. | Polymer | Permeation Coefficient[a] |
|---|---|---|
| 6 | EVOH (32 mol % E) | 0.121 |
| 7 | EVOH (44 mol % E) | 0.026 |
| C7 | high density polyethylene with CaCO$_3$ filler | 19.7 |
| C8 | Modified PET with ionomer and low dens. polyethylene | 3.34 |
| C9 | PET, 0.7 i.v., with ionomer and low dens. polyethylene | 0.035 |
| C10 | PET, i.v. 0.68 | 0.016 |
| C11 | Modified polyester of ethylene glycol with terephthalic and isophthalic acids (ca. 92/8) | 0.011 |
| C12 | Modified polyester similar to C12 (t/i ratio ca. 86/14) | 0.002 |

[a] $10^{-10}$ (cm$^3$-STP)(cm)/(sec)(cm$^2$)(cm-Hg)

Examples 8–9 and Comparative Examples C13 and C14

Solvent Stress Cracking

Samples of a polymer (ABS) which is subject to solvent stress cracking were prepared in the form of injection molded flex bars, 127 mm×13 mm×3.2 mm. For Examples 5 and 6 the flex bar was laminated with the ethylene-vinyl alcohol copolymer of Example 1. The test bar was placed between two sheets of EVOH each about 0.76 mm thick (without adhesive) and this structure was placed in a mold in a heated press. The resulting lamination covered both faces and the edges of the test bar. Each sample was held in a three-point metal jig which imparted 3% bending strain to the bar. The jig and the sample bar were placed in a covered glass jar which contained HCFC 123 (CHCl$_2$CF$_3$). The sample was held above the liquid so that it was exposed only to the solvent vapors. The results are shown in Table III.

TABLE III

| Ex. | Sample | Results |
|---|---|---|
| C13 | ABS ("Cycolac ™ DFA-1000R") | cracked through in ca. 3 minutes. |

TABLE III-continued

| Ex. | Sample | Results |
|---|---|---|
| C14 | ABS (Monsanto) | started to crack in 4 minutes badly cracked at 9 minutes, fully cracked through at 13 minutes. |
| 8 | ABS of C9 + EVOH lamination | surface whitening behind the EVOH layer, with cracks developing over time. |
| 9 | Repeat of Ex. 3 | severely cracked after 1 hour (appears to initiate at flaws in lamination.) |

(An experiment in which coating of ABS by EVOH was attempted by solvent dipping resulted in severe cracking within 6 minutes, presumably because of incomplete coating by the EVOH.)

Examples 10 and 11 and Comparative Example C15

Two- or three-layer films were prepared by extrusion lamination of a 127 micrometer (5 mil) layer of an ethylene vinyl alcohol copolymer containing 44 mole percent copolymerized ethylene to a layer 127 micrometers (5 mil) thick of an adhesive composition (Film A) or to two layers, each 64 micrometers (2.5 mils) thick of the adhesive composition, one layer on each side of the EVOH layer (Film B). In both cases the adhesive composition was a blend of 80 parts of a copolymer of ethylene with 28 weight % n-butyl acrylate and 14 weight % CO, grafted with 1.0 weight % maleic anhydride 20 parts of an ungrafted copolymer of ethylene, 30 wt. % n-butyl acrylate, and 10 wt. % CO, melt index 100 dg/min.

The films can be used directly in lamination with an ABS sheet to provide a multiple layer structure in which the graft copolymer blend serves as an adhesive layer. To demonstrate regrind capability, samples of Film A and Film B, respectively, were cut into pieces about 1 cm square and dry blended with acrylonitrile-butadiene-styrene copolymer ("ABS," Cycolac ™ N14 from General Electric Plastics) in the proportions indicated in Table VI. The dry blends were melt blended and then formed into test plaques as described above, and Gardner impact strength (ASTM D-3029) was measured. The results, reported in Table VI, indicate that the adhesive layer functions as a compatibilizer in the melt blend to provide blends with good impact strength.

TABLE VI

| Ex. | ABS, % | Film A, % | Film B, % | Impact Strength[a] |
|---|---|---|---|---|
| C15 | 100 | 0 | 0 | 35.2 |
| 10 | 91 | 9 | 0 | ≧36.1 |
| 11 | 91 | 0 | 9 | 34.7 |

[a] in N-m

EXAMPLES 12 & C16

Examples 12, and C16 were prepared by the following procedures:
1. the ingredients were dry blended in either pellet form or ground up film form and melt mixed in a 28 mm twin screw extruder compound mixing process to produce pellets;
2. the pellets were injection molded into ⅛th inch by 3 inch by 5 inch plaques for the gardner Impact test.

The impact test results show the compatibilization efficienies in toughness recovery; un-compatibilized blends of HIPS and EVOH were brittle.

|  | C-16[1] | EXAMPLE 12[1] |
|---|---|---|
| HIPS | 7100 | 4000 |
| FBC T10039* |  | 114 |
| GARDNER IMPACT, |  |  |
| IN-LB AT RT | 175 | 173 |
| −10 C. | 91 | 115 |

[1]Amounts indicated are in grams
*Ground HIPS compatibilizer (5 mil:5 mil) multilayer film to provide 61.2 gm of EVOH (44 mole % ethylene) and 52.8 gm of HIPS compatibilizer. The HIPS compatibilzer is a blend of maleic anhydride grafted EVA, polystryene, and tackifiers.

What is claimed is:

1. A refrigeration cabinet comprising:
an interior liner having a single styrene-based structural layer susceptible to damage upon exposure to hydrohalocarbon blowing agents, an outer wall and an insulation foam disposed between the interior liner and the outer wall, said foam being derived from a hydrohalocarbon blowing agent,
said interior liner having:
(a) the singular styrene-based structural layer susceptible to damage upon exposure to hydrohalocarbon blowing agents,
(b) an adhesive layer in contact with the styrene-based structural layer, said adhesive layer comprising an ethylene copolymer grafted with an anhydride or carboxylic acid moiety, and
(c) a hydrohalocarbon barrier layer in contact with the adhesive layer, said layer acting as a barrier between the styrene-based structural layer and the insulation foam wherein said barrier layer comprises at least about 50 weight percent ethylene vinyl alcohol copolymer and wherein the vinyl alcohol moieties are at least about 80% saponified, said ethylene vinyl alcohol copolymer comprising from about 25 to about 60 mole percent ethylene moieties.

2. The refrigeration cabinet of claim 1, wherein the liner is thermoformed and wherein the barrier layer comprises at least about 50 weight percent ethylene vinyl alcohol ("EVOH") copolymer, and wherein the vinyl alcohol moieties are at least about 80% saponified, said EVOH copolymer comprising about 35 to about 60 mole percent ethylene moieties.

3. The refrigeration cabinet of claim 2 wherein the adhesive layer comprises:
a copolymer derived from:
i.) ethylene,
ii.) a vinyl ester or an acid derivative of a vinyl ester, and
iii) an anhydride or carboxylic acid grafting monomer.

4. The refrigeration cabinet of claim 3, wherein the structural layer comprises: regrind from the structural layer, the adhesive layer and the barrier layer.

5. The refrigeration cabinet of claim 3 wherein the adhesive layer comprises a copolymer derived from:
a) about 20 to about 85 weight parts ethylene;
b) about 15 to about 80 weight parts vinyl acetate, unsaturated carboxylic acids or unsaturated derivatives of carboxylic acids, and
c) about 0.01 to about 5 weight parts of a comonomer containing pendant carboxylic acid or anhydride functionality.

6. The refrigeration cabinet of claim 5 wherein the thickness of the adhesive layer is about 1% to about 500% of the thickness of the barrier layer.

7. The refrigeration cabinet of claim 6 wherein the ethylene copolymer adhesive is compatible with the regrind material.

8. The refrigeration cabinet of claim 7, wherein the adhesive layer is about 100% to about 200% of the thickness as the barrier layer.

* * * * *